(12) United States Patent
Wang et al.

(10) Patent No.: US 11,361,456 B2
(45) Date of Patent: Jun. 14, 2022

(54) SYSTEMS AND METHODS FOR DEPTH ESTIMATION VIA AFFINITY LEARNED WITH CONVOLUTIONAL SPATIAL PROPAGATION NETWORKS

(71) Applicants: Baidu USA, LLC, Sunnyvale, CA (US); Baidu.com Times Technology (Beijing) Co., Ltd., Beijing (CN)

(72) Inventors: Peng Wang, Sunnyvale, CA (US); Xinjing Cheng, Beijing (CN); Ruigang Yang, Beijing (CN)

(73) Assignees: Baidu USA LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 191 days.

(21) Appl. No.: 16/770,612

(22) PCT Filed: Jun. 29, 2018

(86) PCT No.: PCT/CN2018/093733
§ 371 (c)(1),
(2) Date: Jun. 7, 2020

(87) PCT Pub. No.: WO2020/000390
PCT Pub. Date: Jan. 2, 2020

(65) Prior Publication Data
US 2021/0174524 A1 Jun. 10, 2021

(51) Int. Cl.
*G06T 7/50* (2017.01)
*G06N 3/08* (2006.01)

(52) U.S. Cl.
CPC .............. *G06T 7/50* (2017.01); *G06N 3/08* (2013.01); *G06T 2207/20081* (2013.01); *G06T 2207/20084* (2013.01)

(58) Field of Classification Search
CPC ......... G06T 2207/10028; G06T 19/006; G06T 7/50; G06T 7/11; G06T 2207/20084;
(Continued)

(56) References Cited

U.S. PATENT DOCUMENTS 10,332,509 B2 * 6/2019 Catanzaro ............... G10L 25/21
2015/0302297 A1 * 10/2015 Griswold ........... G01R 33/5608
706/23
(Continued)

FOREIGN PATENT DOCUMENTS

CN 106981080 A 7/2017
CN 107578436 A 1/2018

OTHER PUBLICATIONS

International Search Report, dated Mar. 27, 2019, in International Application No. PCT/CN2018/093733, filed Jun. 29, 2018. (3pgs).
(Continued)

*Primary Examiner* — Ajibola A Akinyemi
(74) *Attorney, Agent, or Firm* — North Weber & Baugh LLP

(57) ABSTRACT

Presented are systems and methods for improving speed and quality of real-time per-pixel depth estimation of scene layouts from a single image by using an end-to-end Convolutional Spatial Propagation Network (CSPN). An efficient linear propagation model performs propagation using a recurrent convolutional operation. The affinity among neighboring pixels may be learned through a deep convolutional neural network (CNN). The CSPN may be applied to two depth estimation tasks, given a single image: (1) to refine the depth output of existing methods, and (2) to convert sparse depth samples to a dense depth map, e.g., by embedding the depth samples within the propagation procedure. The conversion ensures that the sparse input depth values are preserved in the final depth map and runs in real-time and is, thus, well suited for robotics and autono-
(Continued)

mous driving applications, where sparse but accurate depth measurements, e.g., from LiDAR, can be fused with image data.

20 Claims, 14 Drawing Sheets

(58) Field of Classification Search
CPC ............... G06T 17/20; G06T 7/593; G06T 2207/20081; G06T 19/20; G06T 19/00; G06T 2200/04; G06T 2207/10012; G06T 7/60; G06T 2207/10024; G06T 2207/20021; G06T 3/4038; G06T 7/55; G06T 15/06; G06T 15/20
USPC ........................................................ 382/106
See application file for complete search history.

(56) References Cited

U.S. PATENT DOCUMENTS

2017/0185585 A1* 6/2017 Applegate ............ G06N 3/0472
2018/0292784 A1* 10/2018 Nguyen ................. G02B 21/18
2019/0340507 A1* 11/2019 Cervantes ............. G06N 3/0454

OTHER PUBLICATIONS

Written Opinion of the International Searching Authority, dated Mar. 27, 2019, in International Application No. PCT/CN2018/093733, filed Jun. 29, 2018. (3pgs).
Liu et al.,"Supplementary Material: Learning Affinity via Spatial Propagation Networks." arXiv preprint arXiv:1710.01020, 2017. (4pgs).
Lu et al., "Monocular Infrared Image Depth Estimation Based on Deep C0nvoluti0nal Neural Networks," ACTA OPTICA SINICA 31, vol. 36, No. 7, ISSN:0253-2239, 2016. (10 pgs).
Yaoyu et al.,"Structured Deep Learning Based Depth Estimation from a Monocular Image," ROBOT, vol. 39, No. 6, ISSN:1002-0446, 2017. (8pgs).
The Extended European Search Report dated Jan. 7, 2022, In European Application No. 18 924 550.9. (6pgs).
Uhrig et al.,"Sparsity Invariant CNNs," In 2017 International Conference on 3D Vision (3DV), IEEE, Oct. 2017. (10pgs).
Liu et al.,"Learing Affinity via Spatial Propagation Networks," arXiv preprint arXiv: 1710.01020, Oct. 2017. (14pgs).
Long et al.,"Fully convolutional networks for semantic segmentation," In CVPR, 2015. (10 pgs).
Ronneberger et al.,"U-Net: Convolutional Networks for BiomedicalImage Segmentation," arXiv preprint arXiv:1505.04597, 2015. (8pgs).
Ma et al.,"Sparse-to-dense: Depth prediction from sparse depth samples and a single image," arXiv preprint arXiv:1709.07492, 2018. (8pgs).
Liu et al.,"Learning Affinity via Spatial Propagation Networks," arXiv preprint arXiv:1710.01020, 2017. (14 pgs).
Liao et al.,"Parse Geometry from a Line: Monocular Depth Estimation with PartialLaser Observation," arXiv preprint arXiv:1611.02174. 2016. (9pgs).
Wang et al.,"Designing deep networks for surface normal estimation," In CVPR, 2015. (9pgs).
Li et al.,"A Two-Streamed Network for Estimating Fine-ScaledDepth Maps from Single RGB Images," In ICCV, 2017. (9pgs).
Kuznietsov et al.,"Semi-supervised deep learning for monocular depth map prediction," arXiv preprint arXiv:1702.02706, 2017. (14 pgs).
Godard et al.,"Unsupervised monocular depth estimation with left-right consistency," arXiv preprint arXiv:1609.03677, 2017. (14 pgs).
Zhou et al.,"Unsupervised Learning of Depth and Ego-Motion from Video," In CVPR, 2017. (10 pgs).
Yang et al.,"Unsupervised Learning of Geometry from Videoswith Edge-Aware Depth-Normal Consistency," In AAAI, 2018. (8pgs).
Yang et al.,"Lego: Learning edge with geometry all at once by watching videos," arXiv preprint arXiv:1803.05648, 2018. (13pgs).
Wang et al.,"Towards unified depth and semantic prediction from a single image," In CVPR, 2015. (10pgs).
Liu et al.,"Deep Convolutional Neural Fields for Depth Estimation from a Single Image," In CVPR, 2015. (9pgs).
Li et al.,"Depth and surface normal estimation from monocular images using regressionon deep features and hierarchical CRFs," In CVPR, 2015.(9 pgs).
Zheng et al.,"Conditional random fields as recurrent neural networks," In ICCV, 2015. (17pgs).
Wang et al.,"SURGE: surface regularized geometry estimation from a single image," In NIPS, 2016. (9 pgs).
Barron et al.,"The Fast Bilateral Solver," arXiv preprint arXiv:1511.03296, 2016. (50pgs).
Matsuo et al.,"Depth image enhancement using local tangent plane approximations," In Proceedings of the IEEE Conference on Computer Vision and Pattern Recognition, 2015.(11p).
Ferstl et al.,"Image Guided Depth Upsampling using Anisotropic Total Generalized Variation," In ICCV, 2013. (8pgs).
Ferstl et al.,"Variational depth superresolution using example-based edge representations," In ICCV, 2015. (9pgs).
Liu et al.,"Learning to diffuse: A new perspective to design pdes for visual analysis," [online], [Retrieved Apr. 17, 2020]. Retrieved from Internet <URL: https://ieeexplore.ieee.org/document/7393839> in IEEE, 2016. (2pgs).
Dong et al.,"Learning a Deep Convolutional Network forImage Super-Resolution," In European Conference on Computer Vision, 2014. (16pgs).
Yang et al.,"Color-Guided Depth Recovery From RGB-D DataUsing an Adaptive Autoregressive Model," In IEEE Transactions On Image Processin, 2014 (16pgs).
Song et al.,"Deep depth super-resolution: Learning depth super-resolution using deep convolutional neural network," arXiv preprint arXiv:1607.01977, 2016. (13pgs).
Hui et al.,"Depth Map Super-Resolution byDeep Multi-Scale Guidance," In: European Conference on Computer Vision, 2016. (17pgs).
Kwon et al.,"Data-driven depth map refinement via multi-scale sparse representation," In Proceedings of the IEEE Conf on Computer Vision & Pattern Recognition, 2015. (9pgs).
Riegler et al.,"ATGV-Net: Accurate Depth Super-Resolution," arXiv preprint arXiv:1607.07988, 2016. (32pgs).
J. Weickert et al.,"Anisotropic diffusion in image processing," vol. 1. Teubner Stuttgart,1998. (184 pgs).
Maire et al.,"Affinity CNN: Learning Pixel-Centric Pairwise Relations for Figure/Ground Embedding," arXiv preprint arXiv:1512.02767, 2016. (11 pgs).
Bertasius et al.,"Convolutional Random Walk Networks for Semantic Image Segmentation," arXiv preprint arXiv:1605.07681, 2017. (9 pgs).
Chen et al.,"Semantic Image Segmentation with Task-Specific Edge Detection Using CNNsand a Discriminatively Trained Domain Transform," In: CVPR, 2016. (10pgs).
Zimmermann et al.,"Learning for Active 3D Mapping," arXiv preprint arXiv:1708.02074, 2017. (9 pgs).
Ladicky et al.,"From point clouds to mesh using regression," In ICCV, 2017. (10pgs).
Uhrig et al.,"Sparsity Invariant CNNs," arXiv preprint arXiv:1708.06500, 2017. (16pgs).
Kschischang et al.,"Factor graphs and the sum-product algorithm," [online], [Retrieved Apr. 17, 2020]. Retrieved from Internet <URL: http://web.cs.iastate.edu/~honavar/factorgraphs.pdf> 1998. (76pgs).
I. Sobel "History and Definition of Sobel Operator," [online], [Retrieved Apr. 18, 2020]. Retrieved from Internet <URL: https://www.scribd.com/document/271811982/History-and-Definition-of-Sobel-Operator> (1 pg).
Krähenbühl et al.,"Efficient inference in fully connected crfs with gaussian edge potentials," arXiv preprint arXiv:1210.5644, 2012. (9 pgs).
Deng et al.,"ImageNet: A Large-Scale Hierarchical Image Database," In: IEEE Conference, 2009. (8pgs).

(56) References Cited

OTHER PUBLICATIONS

Igarashi et al.,"As-Rigid-As-Possible Shape Manipulation," ACM transactions on Graphics, 21, 3, 777—784., 2005. (8pgs).
Silberman et al.,"Indoor Segmentation and Support Inferencefrom RGBD Images,"In ECCV-12 submission ID 1079, 2012. (14pgs).
Geiger et al.,"Are we ready for Autonomous Driving?The KITTI Vision Benchmark Suite," In CVPR, 2012. (8pgs).
Eigen et al., "Predicting depth, surface normals and semantic labels with a common multi-scale convolutional architecture," In ICCV, 2015. (9pgs).
Laina et al.,"Deeper depth prediction with fully convolutional residual networks," arXiv preprint arXiv:1606.00373, 2016. (12pgs).
Xiao et al.,"SUN3D: A Database of Big Spaces Reconstructed using SfM and Object Labels," In IEEE International Conference on Computer Vision, 2013. (8pgs).
Chang et al.,"Matterport3D: Learning from RGB-D data in indoor environments," arXiv preprint arXiv:1709.06158, 2017. (25pgs).
Wang et al.,"TorontoCity: Seeing the World with a Million Eyes," ICCV, 2017. (9 pgs).
Huang et al.,"The ApolloScape Dataset for Autonomous Driving," arXiv preprint arXiv:1803.06184, 2018. (7pgs).
Simonyan et al.,"Very deep convolutional networks for large-scale image recognition," arXiv:1409.1556, 2015. (14 pgs).
He et al.,"Deep Residual Learning for Image Recognition," CVPR, 2016. (9pgs).

\* cited by examiner

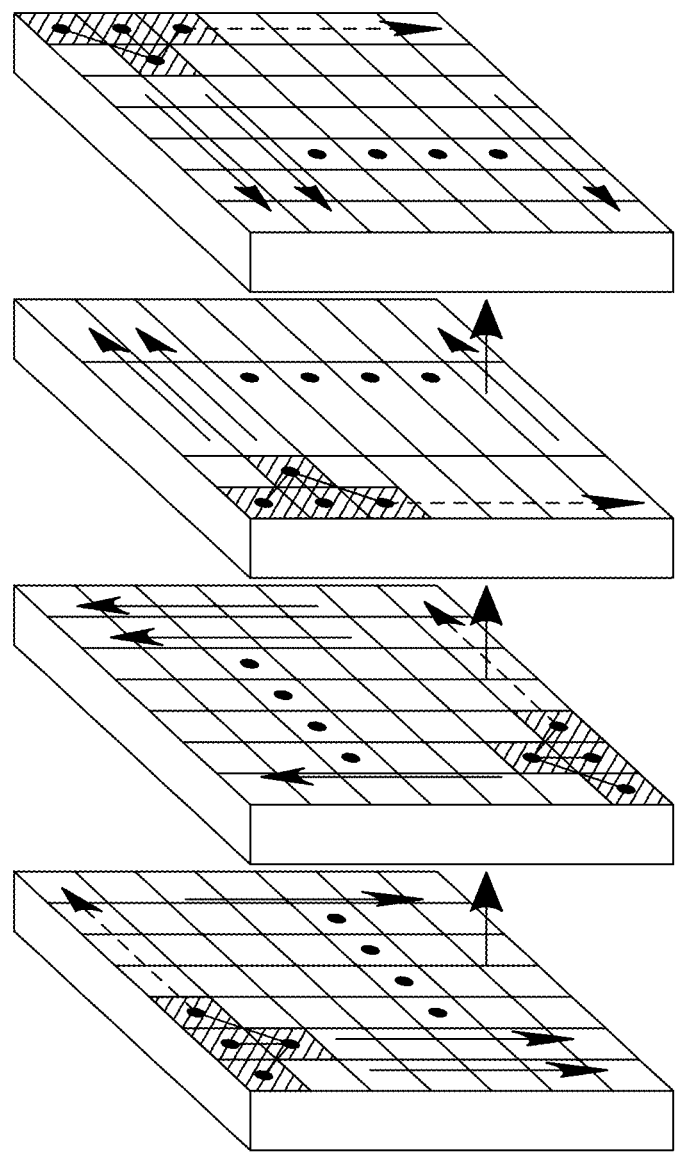
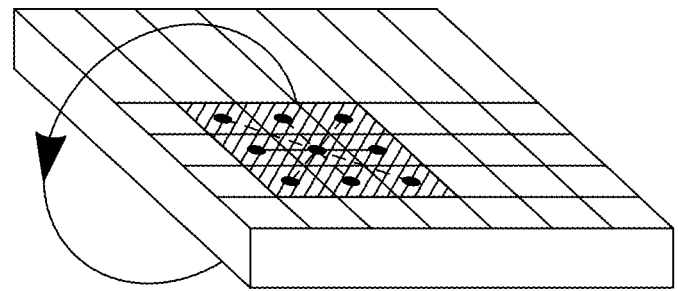
FIGURE 2A (PRIOR ART)
FIGURE 2B

1100

1110 — INPUT AN IMAGE INTO A MODEL THAT HAS BEEN TRAINED END-TO-END AND COMPRISES A CSPN THAT RECEIVES A SPARSE DEPTH VALUES AND CONVERTS AN INITIAL DEPTH MAP, WHICH COMPRISES PIXEL DEPTHS ASSOCIATED WITH STRUCTURES IN AN IMAGE, INTO A REFINED DEPTH MAP THAT COMPRISES SPARSE DEPTH VALUES

1110 — USE THE REFINED DEPTH MAP TO ESTIMATE PIXEL DEPTH FROM THE IMAGE

SYSTEMS AND METHODS FOR DEPTH ESTIMATION VIA AFFINITY LEARNED WITH CONVOLUTIONAL SPATIAL PROPAGATION NETWORKS

CROSS-REFERENCE TO RELATED APPLICATIONS

This patent application is filed pursuant to 35 USC § 371 as a US National Phase Application of International Patent Application No. PCT/CN2018/093733, filed on Jun. 29, 2018, entitled "SYSTEMS AND METHODS FOR DEPTH ESTIMATION VIA AFFINITY LEARNED WITH CONVOLUTIONAL SPATIAL PROPAGATION NETWORKS," listing Peng Wang, Xinjing Cheng, and Ruigang Yang as inventors, which patent document is incorporated by reference herein in its entirety and for all purposes.

TECHNICAL FIELD

The present disclosure relates generally to systems, devices, and methods for image-based depth estimation that may be used for various applications such as augmented reality (AR), autonomous driving, and robotics.

BACKGROUND

Depth estimation from a single image, i.e., predicting per-pixel distance to the camera, is a fundamental problem in computer vision and has many applications that range from AR, autonomous driving, to robotics. Recent efforts to estimate per-pixel depths from a single image have yielded high-quality outputs by taking advantage of deep fully convolutional neural networks (e.g., large amount of training data from indoor and outdoor). The improvement consists mainly in a more accurate estimation of global scene layout and scales with advanced networks, such as Visual Geometry Group (VGG) and residual network (ResNet), and better local structure recovery through deconvolution operation, skip-connections, and up-projection. Upon closer inspection of the output of some approaches, however, the predicted depths are rather blurry and do not align well with the structures in the image, such as object silhouette.

This may be mostly due to the supervised learning pipeline that primarily optimizes the per-pixel errors with high-level features, while paying less attention to the neighboring relationship that exhibits local similarities. Commonly used and effective strategies to address such an issue include affinity propagation through non-local densely connected conditional random fields (CRF), and bilateral filtering.

Existing approaches oftentimes utilize manually designed affinity between neighboring pixels, which could depend on Euclidean distances between RGB values or transformed features from image edges. Recently, some researchers have proposed to directly learn the image-dependent affinity through a deep convolutional neural network (CNN) using a spatial propagation network (SPN), which yields better results when compared to manually designed affinity on image segmentation. However, in such an approach, propagation is performed in a scan-line or scan-column fashion, which is serial in nature. As a result, when propagating left-to-right, pixels at the right-most column must wait for the information from the left-most column to update their value. Depth refinement commonly needs a local context rather than a global one.

Accordingly, what is needed are systems and methods that overcome the shortcomings of existing approaches.

SUMMARY

In a first aspect, the present disclosure provides a method for end-to-end training a model for estimating depth from a single image, the method including: receiving, at a convolutional spatial propagation network (CSPN), an affinity matrix and an initial depth map that comprises pixel depths associated with structures in an image; using, by the CSPN, the affinity matrix and the initial depth map to propagate a local area in a plurality of directions while updating, in parallel, each pixel depth recurrently to improve, for a set of boundaries in a refined depth map, an alignment with a set of boundaries of the structures in the image; outputting, at a final layer of the CSPN, the refined depth map; calculating error; performing backpropagation; and iterating until a stop condition is reached.

In a second aspect, the present disclosure provides a method for estimating depth from a single image, including: inputting an image into a model that has been trained end-to-end by using a convolutional spatial propagation network (CSPN) that converts an initial depth map that comprises pixel depths associated with structures in an image into a refined depth map by propagating a local area in a plurality of directions while recurrently updating, in parallel, each pixel depth; and using the refined depth map to estimate pixel depth from the image.

In a third aspect, the present disclosure provides a Convolutional Spatial Propagation Network (CSPN) system including: a processor; and a non-transitory computer-readable medium comprising instructions that, when executed by the processor, cause steps to be performed, the steps including: receiving, by a convolutional neural network (CNN), an image to generate an initial depth map; receiving, by an input layer, at least an affinity matrix and the initial depth map, the initial depth map comprising pixel depths associated with structures in the image; using a recurrent neural network (RNN) to propagate a local area in a plurality of directions while updating, in parallel, each pixel depth to improve, for a set of boundaries in a refined depth map, an alignment with a set of boundaries of the structures in the image; and outputting, at a final layer, refined depth map.

BRIEF DESCRIPTION OF THE DRAWINGS

References will be made to embodiments of the disclosure, examples of which may be illustrated in the figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

FIG. 2A illustrates a propagation process using an existing SPN.

FIG. 2B illustrates an updating operation propagation process using a CSPN according to various embodiments of the present disclosure.

FIG. 11 is a flowchart of an illustrative process for estimating depth from a single image by using a sparse depth matrix, according to various embodiments of the present disclosure.

DETAILED DESCRIPTION OF EMBODIMENTS

Figure 1:
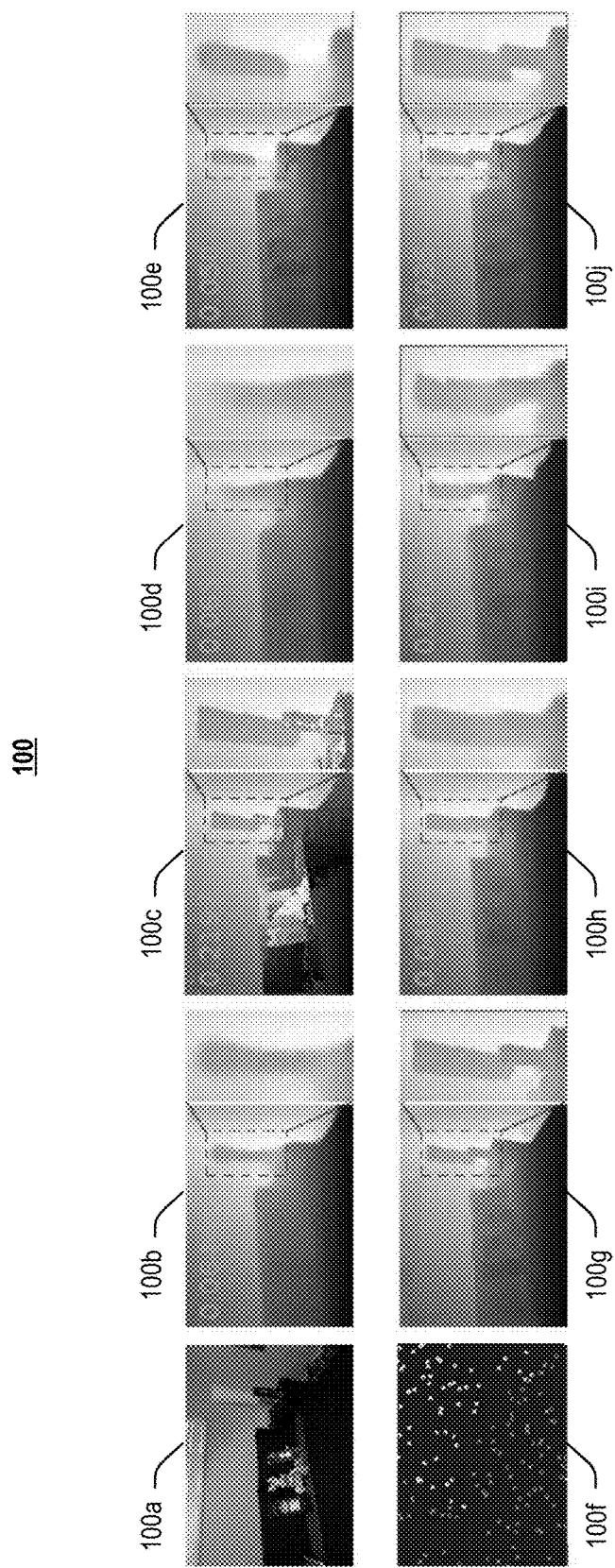
FIG. 1 illustrates exemplary depth estimates from a convolutional spatial propagation network (CSPN), according to various embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

In this document, the term "prior" refers to prior knowledge, including human knowledge. "Online" refers to a dependency on past and current events, as compared to a dependency on future events.

A. GENERAL INTRODUCTION

FIG. 1 illustrates exemplary depth estimates from a convolutional spatial propagation network (CSPN), according to various embodiments of the present disclosure. In embodiments, long range context may be obtained through recurrent operation. 100a shows an input image. 100b illustrates depth using an approach described by Ma et al. in "Sparse-to-dense: Depth prediction from sparse depth samples and a single image." ICRA (2018). 100c illustrates depth after bilateral filtering is applied. 100d illustrates a refined depth map output by a spatial propagation network (SPN) using an approach described by Liu et al. in "Learning affinity via spatial propagation networks" In: Advances in Neural Information Processing Systems. (2017) 1519-1529. 100e illustrates a refined depth map output by a CSPN according to various embodiments of the present disclosure. 100f shows 500 sparse depth samples. 100g shows Ground Truth. 100h illustrates a depth map output by a CSPN according to various embodiments of the present disclosure. 100i shows refined a depth map output by an SPN with depth sample. 100j illustrates a refined depth map output by a CSPN with depth sample, according to various embodiments of the present disclosure. The corresponding RMSE values placed at the left-top corner of each predicted depth map.

100e illustrates an exemplary depth map that has been estimated using a CSPN according to embodiments of the disclosure. As shown, depth map 100e is more accurate than the refined depth map output after bilateral filtering (100c) or output by an SPN (100d). Experimental result, discussed in Sec. D, demonstrate that embodiments that utilize a parallel update scheme achieve significant performance improvements in both speed and quality when compared to over serial schemes such as SPN.

The systems and methods presented may be easily extended to convert sparse depth samples to a dense depth map given a corresponding image. This task may be used in a wide range of applications, such as in robotics and autonomous vehicles that oftentimes acquire depth perception through light detection and ranging (LiDAR), which usually generates sparse but accurate depth data. By combining the sparse measurement data with images, a full-frame dense depth map may thus be generated. In embodiments, the following requirements may be considered: (1) the recovered dense depth map should align with structures in the image; (2) the depth values associated with sparse samples should be preserved, since these values usually stem from a reliable sensor; and (3) the transition between sparse depth samples and their neighboring depths should be smooth and unnoticeable. In order to satisfy those requirements, in embodiments, first, mirror connections are added based on a network used by Ma et al. As illustrated in 100$h$, this generates a more accurate depth map. In embodiments, the propagation may be embedded into an SPN, e.g., in order to preserve the depth values at sparse points. As shown in 100$i$, this may generate more details and result in a lower error rate than an SPN that does not utilize depth samples (see 100$d$). Finally, as depicted in 100$j$, using a CSPN according to embodiments of the present disclosure instead of an SPN yields the best results. As can be seen, the recovered depth map, even with only 500 depth samples, produces more accurately estimated scene layouts and scales. Experiments use the NYU v2 benchmark for depth estimation with standardized evaluation criteria. In both datasets, various embodiments perform significantly better (30% improvement in most key measurements) when compared to existing deep learning based methods. In addition, various embodiments yield a 2-5 times higher acceleration when compared to SPN.

It is noted that although the systems and methods using a CSPN presented herein are discussed with reference to only two depth estimation tasks, it is understood that the CSPN may equally be applied to other tasks, such as image segmentation and enhancement.

B. RELATED WORK

Estimating depth and prediction enhancement/refinement by spatial propagation from a single image have long been center problems for computer vision and robotics.

Single view depth estimation via CNN and conditional random field (CRF). Deep neural networks (DCN) developed in recent years provide strong feature representation for per-pixel depth estimation from a single image. Numerous algorithms have been developed through supervised methods, semi-supervised methods or unsupervised methods. The learned CNN model shows significant improvement in terms of recovering global scene layouts and recovered detailed structures via taking stronger networks, e.g., ResNet and adding skip and mirror connections, e.g., hourglass network and UNet. Others tried to improve the estimation further by appending a locally connected CRF. More recently, CNN and CRF are shown to be able to jointly learned through backpropagation for image segmentation. For depth estimation, some authors propose using a densely connected CRF, which can be jointly trained with the network. However, the affinity for measuring the coherence of neighboring pixels is manually designed and not efficient enough for applications requiring real-time performance.

Depth Enhancement. Traditionally, depth output can be also efficiently enhanced with explicitly designed affinity through image filtering, or data-driven ones through total variation (TV) and learning to diffuse by incorporating more priors into diffusion partial differential equations (PDEs). However, due to the lack of an effective learning strategy, these methods are not suitable for large-scale complex visual enhancement. Recently, deep learning based enhancement is attracting significant attention and yields impressive results on super-resolution of both images and depths. The network takes low resolution inputs and outputs high-resolution results, and it is trained end-to-end where the mapping between input and output is implicitly learned. However, these methods are only trained and experimented with perfect correspondent ground-truth low-resolution and high-resolution depth maps and often a black-box model. In embodiments presented herein, both the input and ground truth depth may be non-perfect, e.g., depths may be obtained from low-cost LiDAR or a network, thus, an explicit diffusion process to guide the enhancement such as SPN is necessary.

Learning affinity for spatial diffusion. Learning affinity matrix with deep CNN for diffusion or spatial propagation receives high interests in recent years due to its theoretical supports and guarantees. Some approaches have trained a deep CNN to directly predict the entities of an affinity matrix, which demonstrates good performance on image segmentation. However, the affinity is followed by an independent non-differentiable solver of spectral embedding; it cannot be supervised end-to-end for the prediction task. Others introduced a random walk network that optimizes the objectives of pixel-wise affinity for semantic segmentation. Nevertheless, their affinity matrix needs additional supervision from ground-truth sparse pixel pairs, which limits the potential connections between pixels. Yet others have tried to explicit model an edge map for domain transform to improve the output of neural network.

SPN converts the learning of a large affinity matrix for diffusion to learning a local linear spatial propagation, yielding a simple and effective approach for output enhancement. However, as previously discussed in Sec. A above, depth enhancement commonly requires local context, it might not be necessary to update a pixel by scanning the whole image. In contrast, embodiments that use a CSPN are shown to be more efficient and to provide significantly better results, as will be discussed in greater detail in Sec. D below.

Depth estimation with given sparse samples. The task of sparse depth to dense depth estimation was introduced in robotics due to its wide application for enhancing 3D perception. Different from depth enhancement, the provided depths are usually from low-cost LiDAR or one line laser sensors, yielding a map with valid depth in only few hundreds of pixels, as illustrated in 100$f$ in FIG. 1. Some approaches treat a sparse depth map as an additional input to a ResNet based depth predictor, producing superior results when compared to the depth output from a CNN with solely image input. However, the output results are still blurry and do not align well with given structures in the input image, as discussed above in the Background section. In contrast, embodiments directly embed the sampled depth into the diffusion process and satisfy the requirements mentioned in Sec. A.

Some existing approaches directly convert sparse 3D points to dense ones without image input, but the density of sparse points must be high enough to reveal the scene structure, which may not be available in for various embodiments disclosed herein.

C. EMBODIMENTS

Embodiments may be viewed as an anisotropic diffusion process that learns a diffusion tensor through a deep CNN directly from a given image to guide the refinement of the output.

1. Convolutional Spatial Propagation Network

Given a depth map $D_o \in \mathbb{R}^{m \times n}$ that is output from a network, and image $X \in \mathbb{R}^{m \times n}$, one task is to update the depth map to a new depth map $D_n$ within N iteration steps, which first reveals more details of the image, and second improves the per-pixel depth estimation results.

FIG. 2B illustrates an updating operation propagation process using a CSPN according to various embodiments of the present disclosure. Formally, without loss of generality, we can embed the depth map Do to some hidden space $H \in \mathbb{R}^{m \times n \times c}$. The convolutional transformation functional with a kernel size of k for each time step t could be written as, $$H_{i,j,t+1} = \Sigma_{a,b=-(k-1)/2}^{(k-1)/2} \kappa_{i,j}(a,b) \odot H_{i-a,j-b,t} \qquad (\text{Eq. 1})$$

where $\kappa_{i,j}(0,0) = 1 - \Sigma_{a,b,a,b \neq 0} \kappa_{i,j}(a,b)$, $$\kappa_{i,j}(a,b) = \frac{\kappa_{i,j}(a,b)}{\Sigma_{a,b} |\kappa_{i,j}(a,b)|}$$

where the transformation kernel $\kappa_{i,j}, i,j \in \mathbb{R}^{m \times n \times c}$ is spatially dependent on the input image and will be learned in a model. The kernel size k is usually set as an odd number so that the computational context surrounding pixel (i, j) is symmetric. $\odot$ is element-wise product. In embodiments, kernel weights may be normalized between the range of (-1, 1) so that the model can be stabilized and can converge by satisfying the condition $\Sigma_{a,b,a,b \neq 0} |\kappa_{i,j}(a,b)| \leq 1$. This iteration may be performed N steps to reach a stationary distribution.

Correspondence to diffusion process with a partial differential equation (PDE). It may be shown that the CSPN holds desired properties of an SPN. Formally, the propagation in Eq. (1) may be rewritten as a process of diffusion evolution by first performing column-first vectorization of feature map H to $H_v \in \mathbb{R}^{mn \times c}$.

$$H_v^{t+1} = \begin{bmatrix} 1-\lambda_{0,0} & \kappa_{0,0}(1,0) & \cdots & 0 \\ \kappa_{1,0}(-1,0) & 1-\lambda_{1,0} & \cdots & 0 \\ \vdots & \vdots & \ddots & \vdots \\ \vdots & \cdots & \cdots & 1-\lambda_{m,n} \end{bmatrix} = GH_v^t \qquad (\text{Eq. 2})$$

where $\lambda_{i,j} = \Sigma_{a,b} \kappa_{i,j}(a,b)$ and G is a mn×mn transformation matrix. The diffusion process expressed with a partial differential equation (PDE) is derived as follows, $$H_v^{t+1} = GH_v^t = (I-D+A)H_v^t$$

$$H_v^{t+1} - H_v^t = -(D-A)H_v^t$$

$$\partial H_v^{t+1} = -LH_v^t \qquad (\text{Eq. 3})$$

where L is the Laplacian matrix, D is the diagonal matrix containing the $\lambda_{i,j}$, and A is the affinity matrix which is the off diagonal part of G.

Unlike approaches that scan the whole image in four directions (FIG. 2A) sequentially, the CSPN, in embodiments, propagates a local area towards all directions at each step (FIG. 2B) simultaneously, i.e., with k×k local context, while larger context is observed when recurrent processing is performed, and the context acquiring rate is in the order of O(kN).

Embodiments use the convolutional operation due to the fact that it may be efficiently implemented, e.g., through image vectorization, yielding real-time performance in depth refinement tasks.

2. Spatial Propagation with Sparse Depth Samples

In embodiments, a sparse depth map Ds (400b in FIG. 4) may be used to estimate a depth map, e.g., from an RGB image. In embodiments, a sparse set of pixels is set with depth values measured by one or more depth sensors, which may be used to guide the propagation process.

Similarly, a sparse depth map $Ds = \{d_{i,j}^s\}$ may be embedded into a hidden representation $H^s$, and we can write the updating equation of H by simply adding a replacement step after performing Eq. (1), $$H_{i,j,t+1} = (1-m_{i,j})H_{i,j,t+1} + m_{i,j}H_{i,j}^s \qquad (\text{Eq. 4})$$

where $m_{i,j} = \mathbb{1}(d_{i,j}^s > 0)$ is an indicator for the availability of sparse depth at pixel (i,j).

In embodiments, this ensures that refined depths have the same value at the valid pixels in the sparse depth map. Additionally, information may be propagated from the sparse depth to its surrounding pixels such that the smoothness between the sparse depths and their neighbors is maintained. In embodiments, the diffusion process may cause the final depth map to be relatively well aligned with structures in the image. This fully satisfies the desired three properties for this task previously discussed in Sec. A.

In addition, in embodiments, this process may use the diffusion process with PDE, such that the transformation matrix may be built by simply replacing the rows that satisfy $m_{i,j} = 1$ in G (Eq. (2)), which correspond to sparse depth samples, with $e_{i+j*m}^T$. Here, $e_{i+j*m}$ is a unit vector with the value at i+j*m as 1. Therefore, the summation of each row is still 1, and the stabilization still holds in this case.

Figures 3A, 3B:
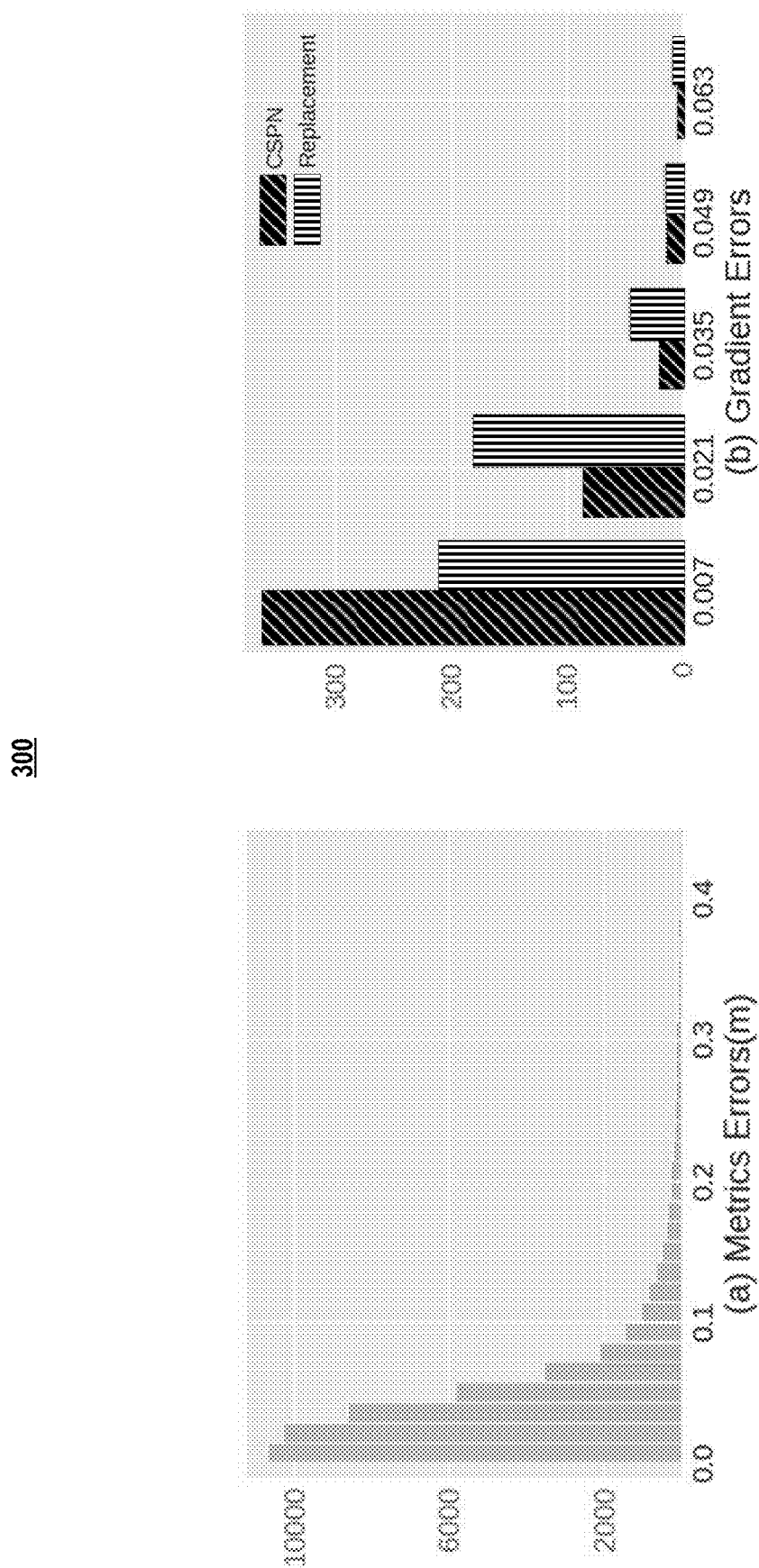
FIG. 3A shows a histogram of root mean square error (RMSE) with depth maps from Ma et al. at given sparse depth points.
FIG. 3B is a comparison of gradient error between depth maps using sparse depth replacement according to FIG. 3A

FIG. 3A shows a histogram of RMSE with depth maps from Ma et al. at given sparse depth points. FIG. 3B is a comparison of gradient error between depth maps using sparse depth replacement according to FIG. 3A and results using a CSPN according to embodiments disclosed herein. The vertical axes show the count of pixels.

Figure 4:
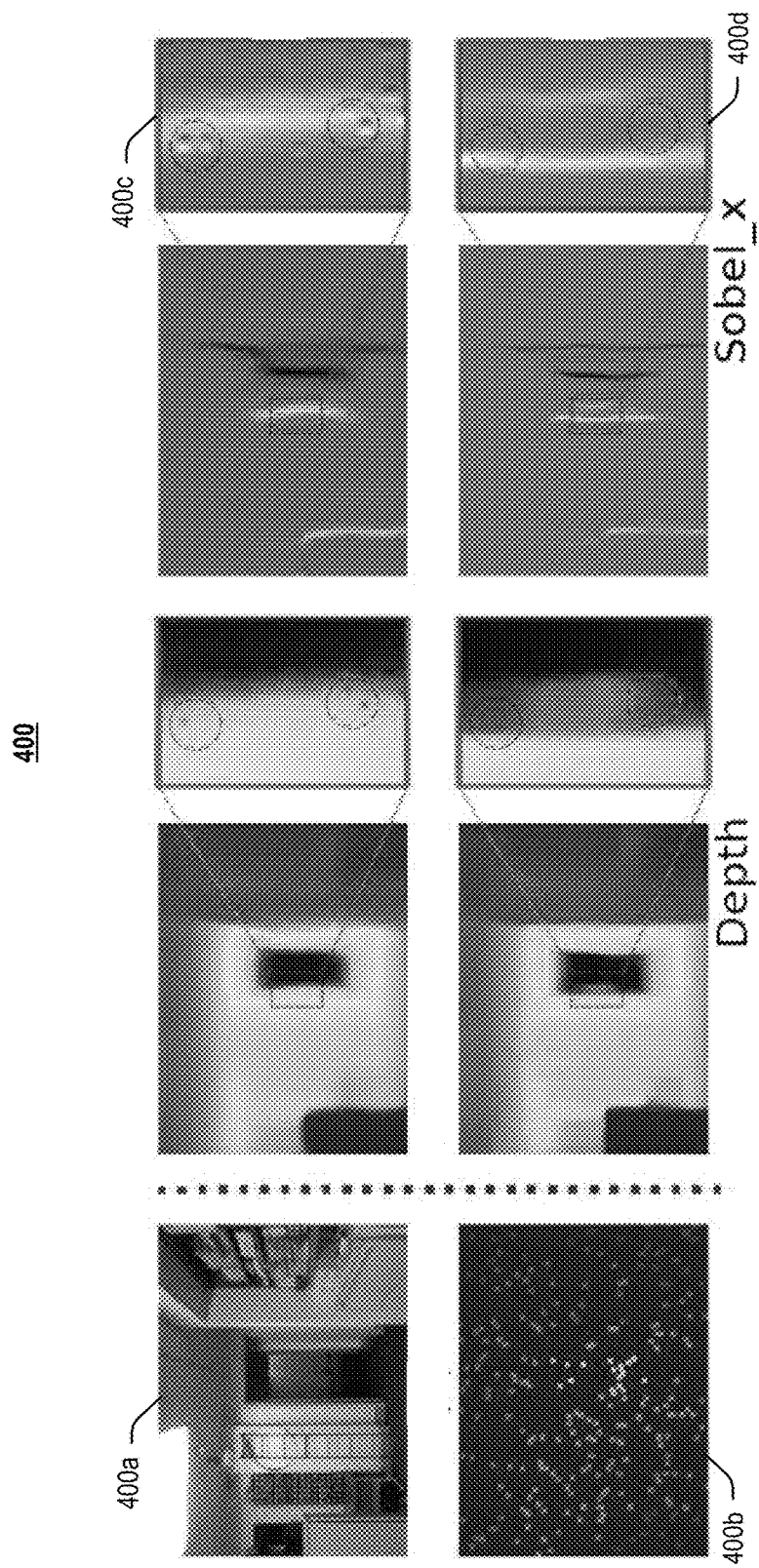
FIG. 4 is a comparison of the depth map in Ma et al. using sparse depth replacement with CSPN according to various embodiments of the present disclosure with respect to smoothness of depth gradient at sparse depth points.

Embodiments have several advantages over existing sparse-to-dense methods. The histogram in FIG. 3A plots depth displacement from ground truth at given sparse depth pixels from the output of Ma et al. As FIG. 3A illustrates, the accuracy of sparse depth points cannot be preserved. In fact, some pixels have a relatively large displacement, e.g., 0.2 m, indicating that directly training a CNN for depth prediction does not preserve the value of real sparse depths provided. While the values could be preserved by simply replacing the depths from the outputs with provided sparse depths at those pixels, this would result in non-smooth depth gradients with respect to surrounding pixels. In FIG. 4, such an example (400c) is plotted at right of the figure. The Sobel gradient of the depth map along the x-direction is computed, where it can be seen that the gradients surrounding pixels with replaced depth values are non-smooth. This is statistically verified in FIG. 3B by using 500 sparse samples. The bars labeled "replacement" are the histogram of gradient error at sparse pixels by comparing the gradient of the depth map with sparse depth replacement and of ground truth depth map. As can be seen, the difference is significant, ⅔ of the sparse pixels have large gradient error. On the other hand, bars labeled "CSPN" in FIG. 3B illustrate that, in embodiments, the average gradient error is much smaller, and most pixels have zero error.

FIG. 4 is a comparison of the depth map in Ma et al. using sparse depth replacement with CSPN according to various embodiments of the present disclosure with respect to smoothness of depth gradient at sparse depth points. 400a shows an input image. 400b shows the sparse depth points. 400d illustrates a depth map using a CSPN with sparse depth points, according to embodiments disclosed herein. The zoomed in regions highlight the differences. As 400d, shows, the depth gradients surrounding sparse pixels are smooth and close to ground truth, which demonstrates the effectiveness of the propagation scheme disclosed herein.

3. Complexity Analysis

As formulated in Eq. (1), a CSPN takes the operation of convolution, where the complexity of using Compute Unified Device Architecture (CUDA) with GPU for one step CSPN is $O(\log_2 (k^2))$, where k is the kernel size. This is because CUDA uses parallel sum reduction, which has logarithmic complexity. In addition, in embodiments, a convolution operation may be performed parallel for all pixels and channels, which has a constant complexity of $O(1)$. Therefore, performing N-step propagation, the overall complexity for CSPN is $O(\log_2 (k^2)/N)$, which is independent of image size (m, n).

SPN uses scanning row/column-wise propagation in four directions. Using k-way connection and running in parallel, the complexity for one step is $O(\log_2 (k))$. The propagation needs to scan full image from one side to another, thus the complexity for SPN is $O(\log_2 (k))(m+n))$. Although this is more efficient than an existing densely connected CRF, whose implementation complexity with permutohedral lattice is $O(mnN)$, in embodiments, $O(\log_2 (k^2)/N)$ is more efficient since the number of iterations N is much smaller than the size of image m, n. As discussed in Sec. D, experiments with k=3 and N=12 show that a CSPN can outperform SPN with a rather large margin, thus, demonstrating both the efficiency and effectiveness of embodiments disclosed herein.

4. End-to-End Architecture

Figure 5:
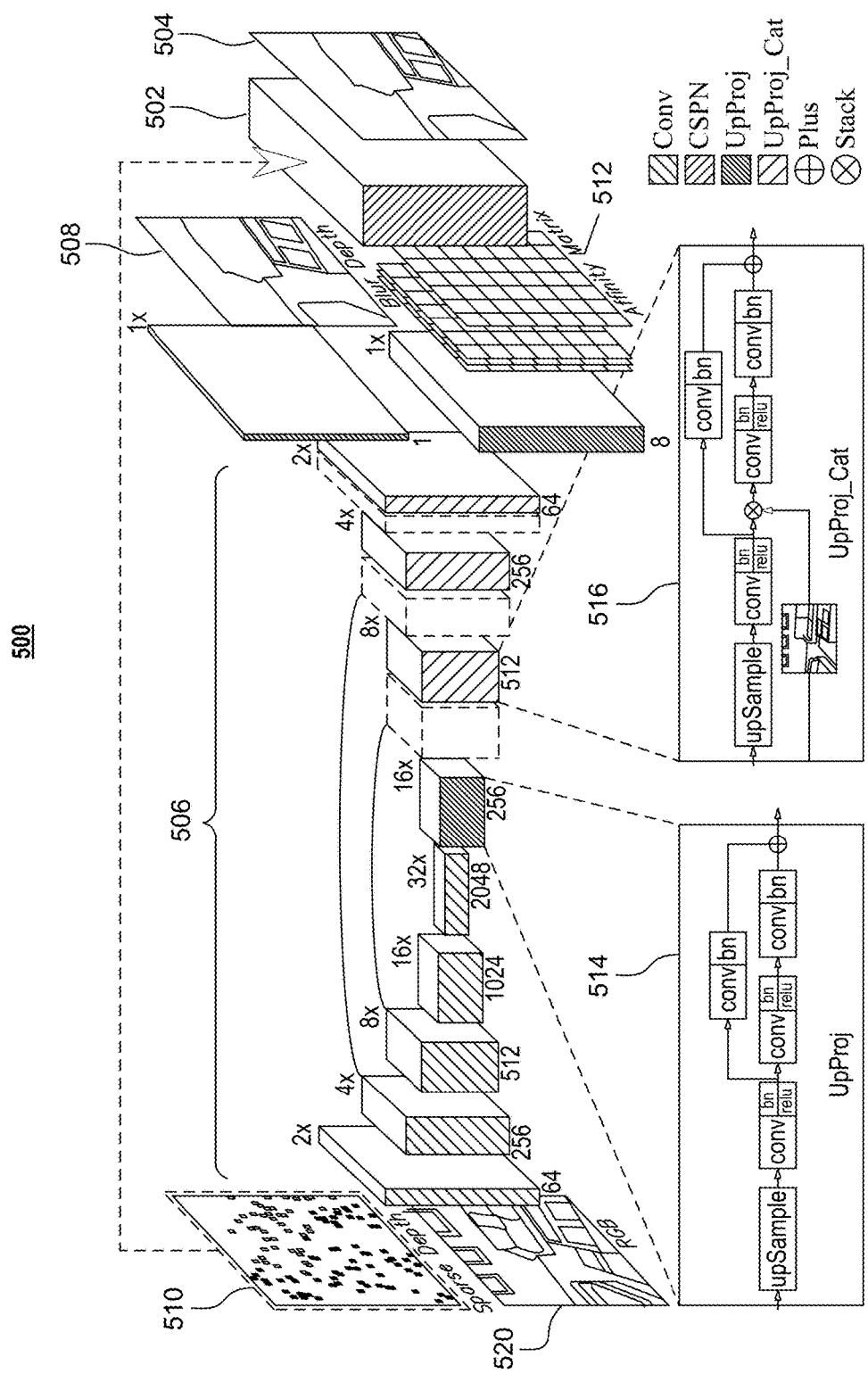
FIG. 5 illustrates an exemplary architecture according to various embodiments of the present disclosure.

FIG. 5 illustrates an exemplary architecture according to embodiments of the disclosure (best viewed in color). Architecture 500 comprises CSPN 502, CNN 506, blur depth 508, output dense depth map 504, affinity matrix 512, input image 520. In embodiments, architecture b 500 comprises mirror connections for depth estimation via transformation kernel prediction with CSPN 502. In embodiments, architecture 500 comprises sparse depth 510 as an optional input that may be embedded into CSPN 502 to guide the depth refinement.

In embodiments, end-to-end network architecture 500 may be used to predict both the transformation kernel and the depth value, which may be the inputs to a CSPN for depth refinement. As depicted in FIG. 5, CSPN layer 502 may output dense depth map 504. In embodiments, to predict the transformation kernel κ in Eq. (1), rather than building a new deep network for learning affinity as some authors have proposed, embodiments branch an additional output from the given network, which shares the same feature extractor with the depth network. In embodiments, this helps to save memory and time cost for joint learning of both depth estimation and transformation kernel prediction.

In embodiments, learning of affinity is dependent on fine-grained spatial details of input image 520. However, spatial information is weakened or lost with the downsampling operation during the forward process of the ResNet in some approaches. Thus, embodiments add mirror connections similar to a U-shape network by directed concatenating the feature from encoder to up-projection layers as illustrated by "UpProj_Cat" layer 516 shown in FIG. 5. In embodiments, affinity matrix 512 may be output by CNN 506 or by a separate CNN not shown in FIG. 5.

One skilled in the art will appreciate that the end-points of mirror connections should be carefully selected. Experiments have shown that out of three positions for appending the connection, i.e., after conv, after bn, and after relu as shown by "UpProj" layer 514, the last position may provide the best results as validated using the NYU v2 dataset (Sec. D.2). In embodiments, not only the depth output from the network is better recovered, but also the results after the CSPN are additionally refined, as discussed further below in Sec. D. Embodiments use the same training loss as Ma et al., yielding an end-to-end learning system.

D. EXPERIMENTS

It shall be noted that these experiments and results are provided by way of illustration and were performed under specific conditions using a specific embodiment or embodiments; accordingly, neither these experiments nor their results shall be used to limit the scope of the disclosure of the current patent document.

This section describes various implementation details, datasets, and evaluation metrics used in experiments. An evaluation of CSPN on both depth refinement and sparse to dense tasks is presented.

Implementation details. The weights of ResNet in the encoding layers for depth estimation (Sec. C.4) may be initialized with models pretrained on the ImageNet dataset. In embodiments, models may be trained using a stochastic gradient descent (SGD) optimizer and a small batch size of, e.g., 24 to train for 40 epochs, and the model that performs the best on a validation set may be used for testing. In embodiments, the learning rate may start at 0.01 and may be reduced, e.g., by 20% for every 10 epochs. In addition, a small weight decay of $10^{-4}$ may be applied for regularization. In embodiments, networks may be implemented based on a PyTorch platform using element-wise product and convolution operation for a one-step CSPN implementation. Depth results show that propagation using a hidden representation H may achieve only a marginal improvement over propagation within the domain of depth D. Therefore, experiments herein were performed directly using D rather than learning an additional embedding layer. For sparse depth samples, 500 sparse samples were used as in Ma et al.

Figure 6A:
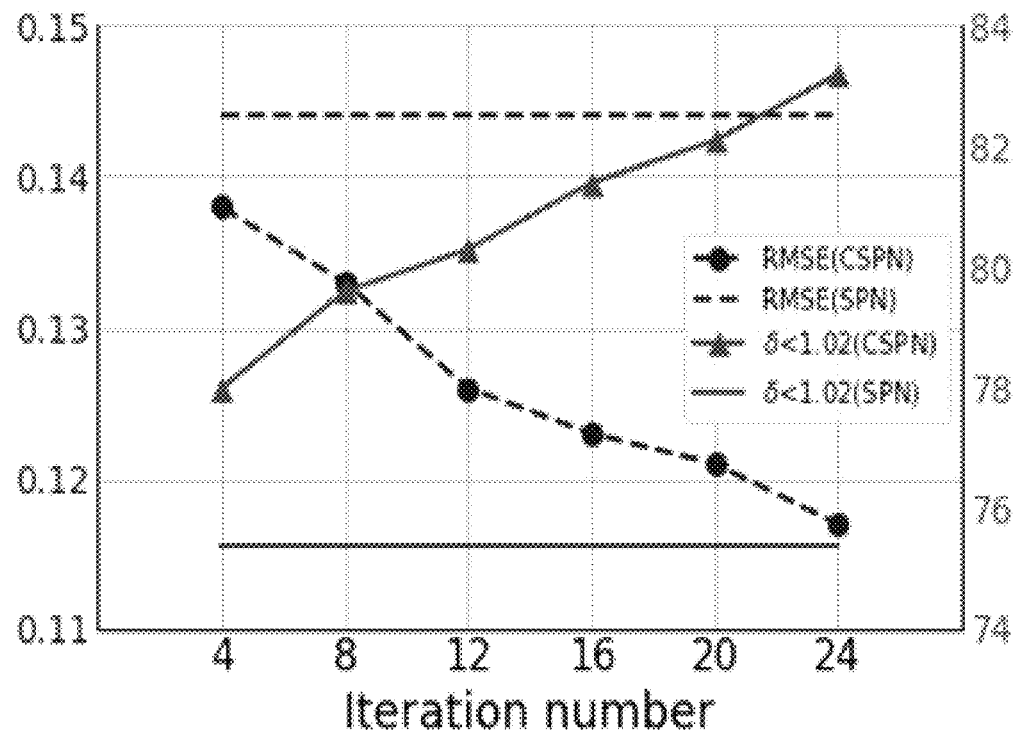
FIG. 6A-FIG. 6C show the results of an ablation study using various embodiments of the present disclosure.
Figure 6B:
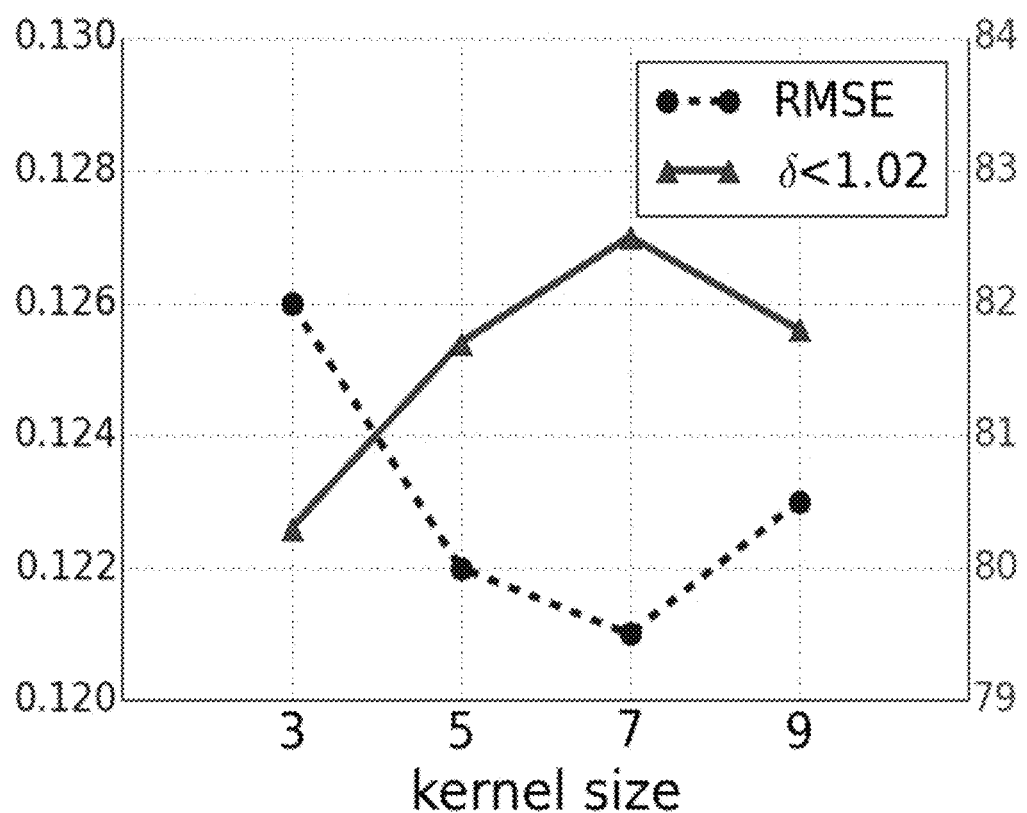
Figure 6C:
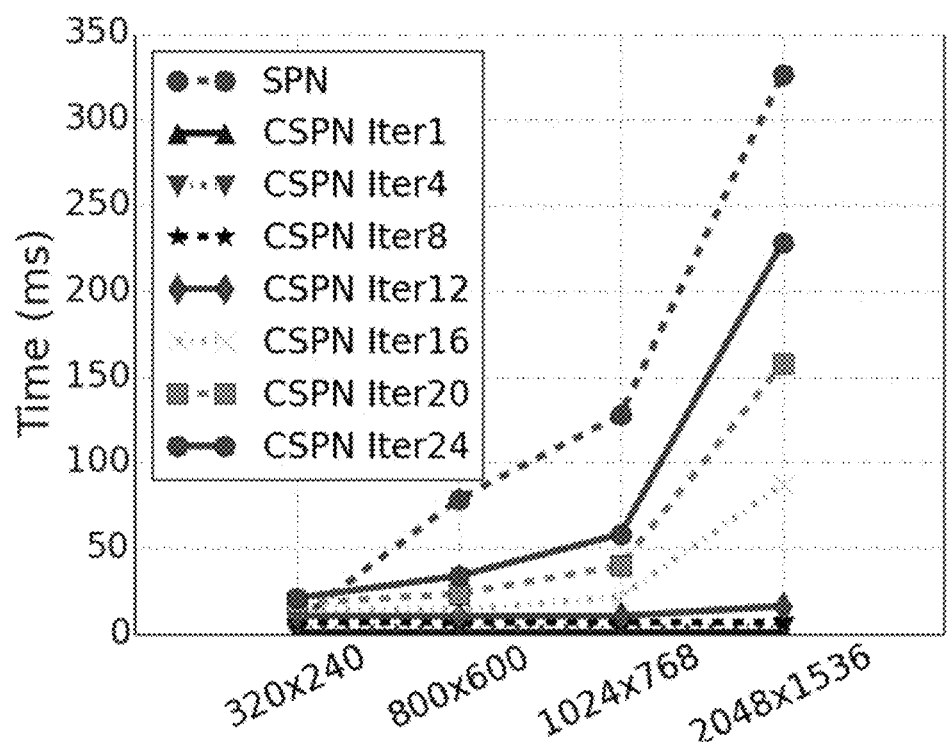

FIG. 6A-FIG. 6C show the results of an ablation study using various embodiments of the present disclosure. FIG. 6A illustrates RMSE (left axis, lower numbers indicating better results) and δ<1.02 (right axis, higher numbers indicating better results) of a CSPN according to embodiments with respect to the number of iterations. Horizontal lines show the corresponding results of the SPN by Liu et al. FIG. 6B illustrates RMSE and δ<1.02 of a CSPN according to embodiments with respect to kernel size. FIG. 6C illustrates testing times with respect to input image size.

1. Dataset and Metrics

Various experiments have been evaluated on the NYU v2 dataset, using commonly used metrics. The NYU-Depth-v2 dataset consists of RGB and depth images collected from 464 different indoor scenes. See Silberman et al., Indoor segmentation and support inference from RGBD images, Proceedings of the 12th European conference on Computer Vision, Oct. 7-13, 2012, Florence, Italy. Experiments herein use the official split of data, i.e., 249 scenes are used for training and 50 k images form the training set are sampled in a same manner as existing approaches. For testing, a standard setting using a small labeled test set with 654 images is used in the final performance. The original image of size 640×480 pixels was first downsampled to half size and then center-cropped, producing a network input size of 304×228 pixels.

Metrics. Metrics and implementations similar to those used in Ma et al. are used. Given ground truth depth D*={d*} and predicted depth D={d}, the metrics may include:

$$(1) RMSE \sqrt{\frac{1}{|D|} \sum_{d \in D} \|d^* - d\|^2};$$

$$(2) AbsRel: \frac{1}{|D|} \sum_{d \in D} |d^* - d|/d^*; \text{ and } (3) \delta_t: \% \text{ of } d \in D,$$

$$\text{s.t.} \max\left(\frac{d^*}{d}, \frac{d}{d^*}\right) < t, \text{ where } t \in \{1.25, 1.25^2, 1.25^3\}.$$

Nevertheless, for metric (3), the depth accuracy was found to be relatively high when sparse depth is provided, t=1.25 is already a very loose criterion where almost 100% of pixels are judged as correct, which can hardly distinguish different methods as shown in (Tab. 1). Thus, in embodiments, stricter criteria for correctness are adopted, e.g., by choosing t∈{1.02, 1.05, 1.10}.

2. Parameter Tuning and Speed Study

Experiments herein evaluate various hyper-parameters, including kernel size k, and number of iterations N in Eq. (1) using the NYU v2 dataset. An empirical evaluation of the running speed on a Titan X GPU on a computer with 16 GB memory is presented.

Number of iterations. A kernel size of 3 may be used to validate the effect of iteration number N in a CSPN. As shown in FIG. 6A, a CSPN according to embodiments may outperform a SPN even when only four iterations are used; and even better performance may be achieved when the number of iterations applied to the model during training is increased. In these experiments, the accuracy is saturated when the number of iterations is increased to 24.

Size of convolutional kernel. As shown in FIG. 6B, a larger convolutional kernel may have a similar effect as an increase in the number of iterations, e.g., due to a larger context that is considered for propagation at each time step. In FIG. 6B, where the number of iterations N is 12, it can be seen that the performance increases with increasing k until saturation occurs at a kernel size of about 7, and the performance slightly drops once the kernel size is set to 9. This may be caused by the fixed number of epochs, i.e., 40, used for experiments, while a larger kernel size may induce more affinity to learn in propagation, which may require a larger number of epochs of data to converge. Experiments show that when more epochs are used to train, a similar performance may be reached as when using a kernel size of 7. Thus, using a kernel size of 7 with 12 iterations may reach a similar performance as using a kernel size of 3 with 20 iterations, which may indicate that a CSPN's trade-off between kernel size and number of iterations. In embodiments, the two settings may run with similar speed, while the latter may cost less memory. Therefore, for purposes of comparison, a kernel size of 3 and a number of iterations of 24 were used.

Concatenation end-point for mirror connection. As discussed in Sec. C.4., based on the given metrics, we experimented three concatenation places, i.e., after conv, after bn and after relu by fine-tuning with weights initialized from encoder network trained without mirror connections. The corresponding RMSE are 0.531, 0.158, and 0.137 correspondingly. Therefore, we adopt the proposed concatenation end-point.

Running speed. FIG. 6C is a running time comparison between SPN and CSPN with a kernel sizes of 3. We use the author's PyTorch implementation online. As can be seen, a better performance may be achieved in relatively less time. For example, four iterations of CSPN on a 1024×768 pixel image take 3.689 ms, while SPN take 127.902 ms. In addition, the time cost of SPN is linearly increasing with image size, while the time cost of CSPN is independent of image size and relatively faster as analyzed in Sec. C.3. In practice, however, when the number of iterations is large, e.g., "CSPN Iter 20," experiments showed that the practical time cost of CSPN also grows with image size. This is because the tested PyTorch-based implementation keeps all variables for each iteration in memory during the testing phase. Memory paging cost becomes dominant for large images. In principle, such a memory bottleneck may be eliminated, e.g., by customizing a new operation. Yet, even without such coding optimization, even at high iterations with large images, the speed of CSPN is still twice as fast as that for SPN.

3. Comparisons

Embodiments are compared against various existing baselines in terms of the two proposed tasks. (1) Refining the depth map using the corresponding color image. (2) Refining the depth map using both the color image and sparse depth samples. For the baseline methods, such as SPN and Sparse-to-Dense, released code was used.

Table 1 shows qualitative comparison results, using the NYU v2 dataset, between embodiments that use a CSPN according to embodiments and other methods. The term "Preserve SD" in Table 1 refers to preserving the depth value at sparse depth samples.

TABLE 1

| Method | Preserve "SD" | lower = better | | higher = better | | | | | |
|---|---|---|---|---|---|---|---|---|---|
| | | RMSE | REL | $\delta_{1:02}$ | $\delta_{1:05}$ | $\delta_{1:10}$ | $\delta_{1:25}$ | $\delta_{1:25}^2$ | $\delta_{1:25}^3$ |
| Ma et al. | | 0.230 | 0.044 | 52.3 | 82.3 | 92.6 | 97.1 | 99.4 | 99.8 |
| +Bilateral | | 0.479 | 0.084 | 29.9 | 58.0 | 77.3 | 92.4 | 97.6 | 98.9 |
| +SPN | | 0.172 | 0.031 | 61.1 | 84.9 | 93.5 | 98.3 | 99.7 | 99.9 |
| +CSPN (Ours) | | 0.162 | 0.028 | 64.6 | 87.7 | 94.9 | 98.6 | 99.7 | 99.9 |
| +UNet (Ours) | | 0.137 | 0.020 | 78.1 | 91.6 | 96.2 | 98.9 | 99.8 | 100.0 |
| +ASAP | ✓ | 0.232 | 0.037 | 59.7 | 82.5 | 91.3 | 97.0 | 99.2 | 99.7 |
| +Replacement | ✓ | 0.168 | 0.032 | 56.5 | 85.7 | 94.4 | 98.4 | 99.7 | 99.8 |
| +SPN | ✓ | 0.162 | 0.027 | 67.5 | 87.9 | 94.7 | 98.5 | 99.7 | 99.9 |

TABLE 1-continued

| Method | Preserve "SD" | lower = better | | higher = better | | | | | |
| --- | --- | --- | --- | --- | --- | --- | --- | --- | --- |
| | | RMSE | REL | $\delta_{1:02}$ | $\delta_{1:05}$ | $\delta_{1:10}$ | $\delta_{1:25}$ | $\delta_{1:25}^2$ | $\delta_{1:25}^3$ |
| +UNet(Ours) + SPN | ✓ | 0.144 | 0.022 | 75.4 | 90.8 | 95.8 | 98.8 | 99.8 | 100.0 |
| +CSPN (Ours) | ✓ | 0.136 | 0.021 | 76.2 | 91.2 | 96.2 | 99.0 | 99.8 | 100.0 |
| +UNet + CSPN (Ours) | ✓ | 0.117 | 0.016 | 83.2 | 93.4 | 97.1 | 99.2 | 99.9 | 100.0 |

NYU v2. Baseline methods are the depth output from the network of Ma et al., together with the corresponding color image. The upper part of Table 1 shows the results for depth refinement with color only. Row labeled "Bilateral" illustrates refining the network output from Ma et al. using bilateral filtering as a post-processing module with their spatial-color affinity kernel tuned on a validation set. Although the output depths snap to image edges (100c in FIG. 1), the absolute depth accuracy is dropped since the filtering over-smoothed original depths. The row labeled "SPN" illustrates the results filtered with SPN, using an affinity network according to embodiments. Due to joint training, the depth is improved with the learned affinity, yielding both better depth details and absolute accuracy. Switching from SPN to CSPN (row "CSPN") yields relative better results. Finally, the row labeled "UNet" shows the results of modifying the network with mirror connections as stated in Sec. 3.4. The results turn out to be even better than those from SPN and CSPN, demonstrating that by simply adding features from beginning layers, the depth can be better learned.

The lower part of Table 1 shows the results of using both color image and sparse depth samples, and all the results preserve the sparse depth value provided. Per image, 500 depth samples are randomly selected from the ground truth depth map. For comparison, a baseline method is considered using as-rigid-as-possible (ASAP) warping. Basically the input depth map is warped with the sparse depth samples as control points. The row labeled "ASAP" shows that the estimation over the baseline network improve just marginally. For SPN, also a similar replacement operation as in Eq. (4) is applied for propagation. The results are shown at the row labeled "SPN," which outperforms both the results from ASAP and SPN without propagation of SD since joint training helps to correct the error of warping. At the row labeled "UNet+SPN," we use our UNet architecture for learning affinity with SPN, which outperforms "SPN," while no improvements were observed over using only UNet. Nevertheless, by replacing SPN with CSPN according to embodiments, as shown in the row labeled "UNet+CSPN," the results can be further improved by a large margin and performs best in all cases. This may be caused by CSPN updating more efficiently than SPN during training.

Figure 7:
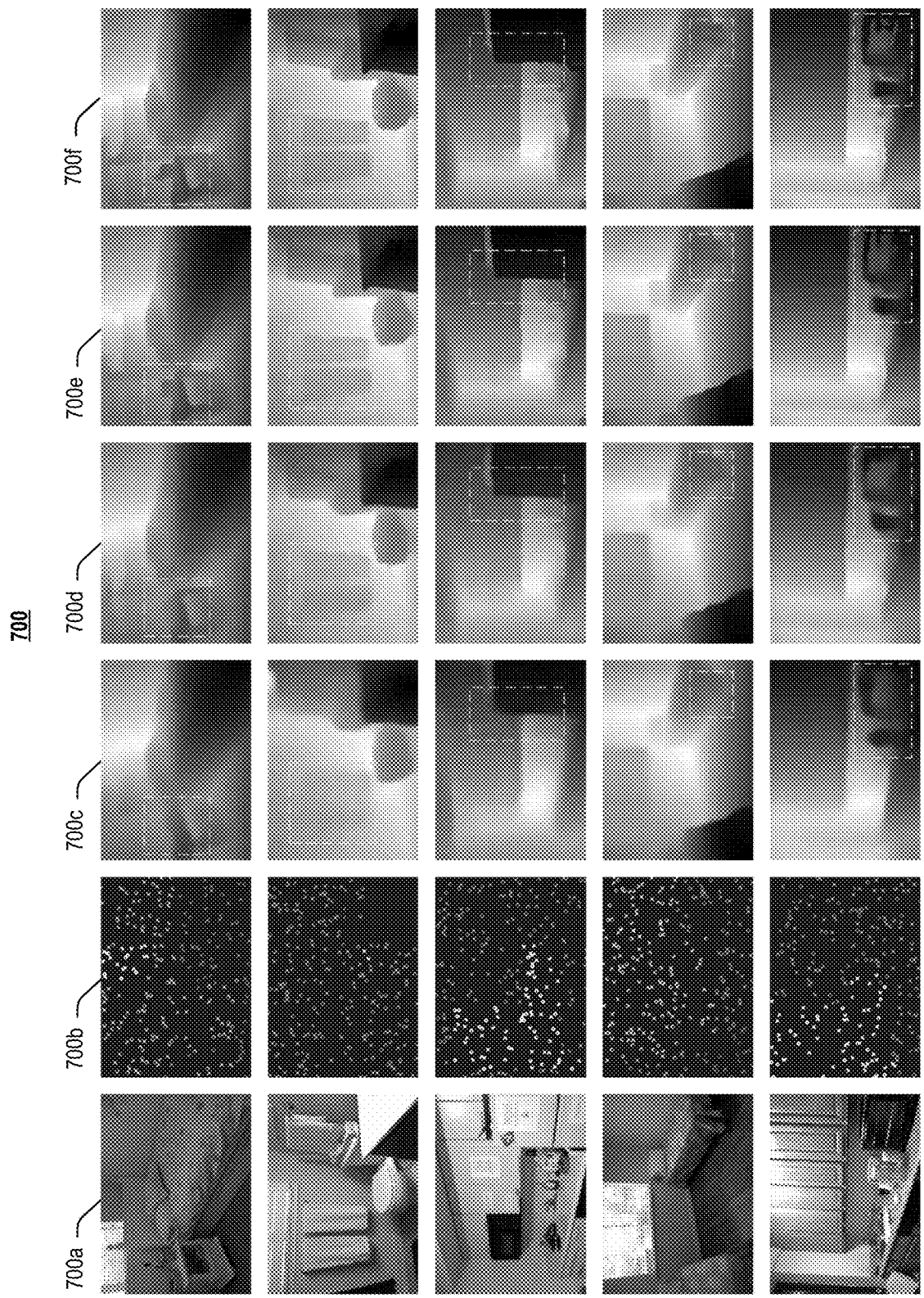
FIG. 7 shows exemplary visualizations according to various embodiments of the present disclosure.

FIG. 7 shows exemplary visualizations according to various embodiments of the present disclosure. 700a shows input images. 700b shows 500 sparse depth samples. 700c illustrates depth using an approach described by Ma et al. FIG. 7D illustrates UNet(Ours)+SPN. FIG. 7E illustrates UNet+CSPN(Ours). 700f illustrates the Ground Truth. Most significantly improved regions are highlighted within dashed boxes (best viewed in color).

A comparison of structures in dashed bounding boxes in FIG. 7 shows that the results of using a CSPN according to embodiments better capture structures in input images FIG. 700a than existing methods, such as those represented by 700c.

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, tablet, personal digital assistant (PDA), smart phone, smart watch, smart package, server (e.g., blade server or rack server), a network storage device, camera, or any other suitable device and may vary in size, shape, performance, functionality, and price. Such a computing system may be placed in a vehicle and coupled to GPS and camera inputs. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 8:
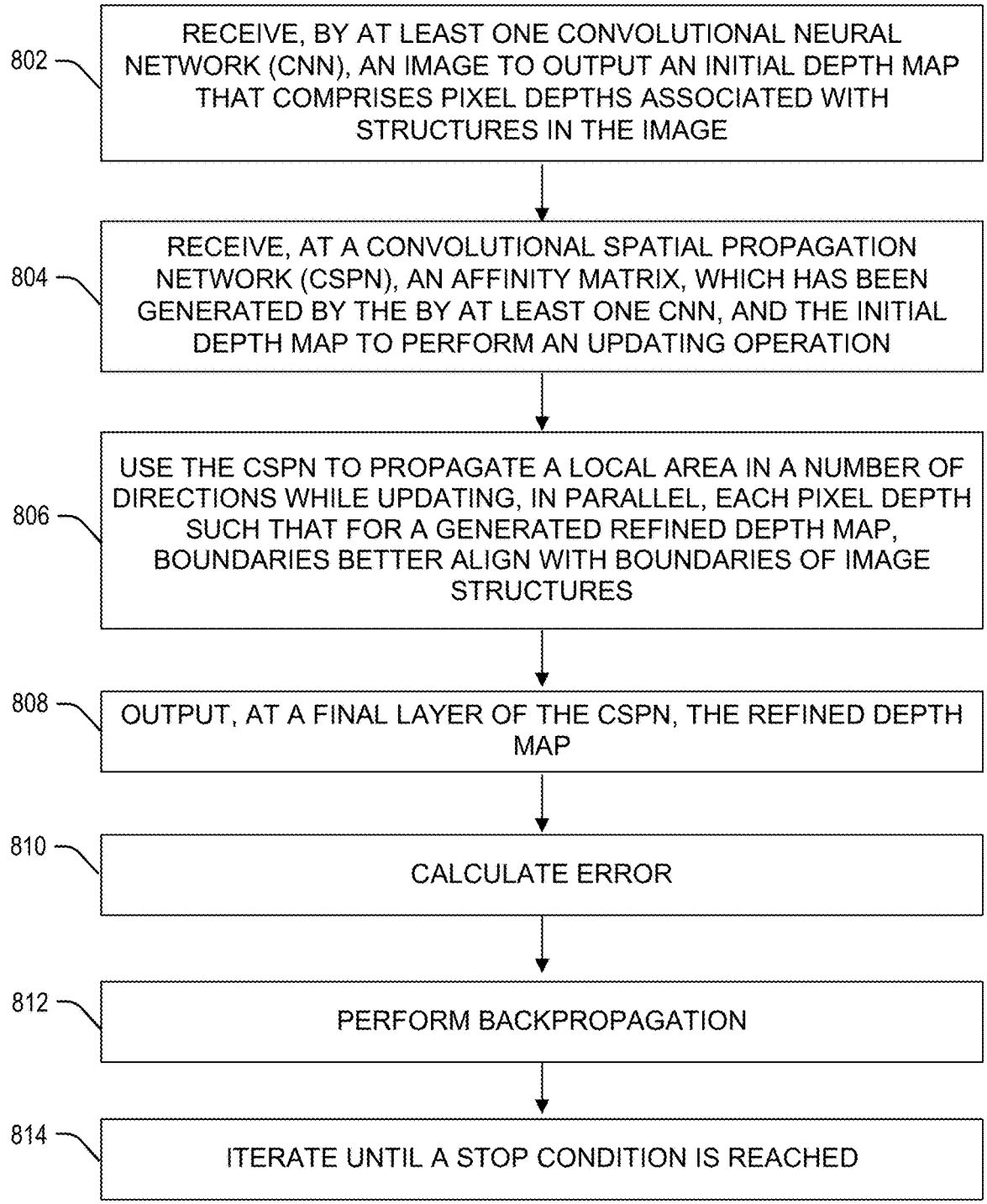
FIG. 8 is a flowchart of an illustrative process for end-to-end training a model for estimating depth from a single image, according to various embodiments of the present disclosure.

FIG. 8 is a flowchart of an illustrative process for end-to-end training a model for estimating depth from a single image, according to various embodiments of the present disclosure. Process (800) for training the model may begin when a CNN receives (802) an image and outputs an initial depth map that comprises pixel depths associated with structures in the image. In embodiments, the CNN may generate an affinity matrix. However, this is not a limitation on the scope of the disclosure as an affinity matrix may equally be generated by another CNN.

In embodiments, a CSPN receives (804) the affinity matrix and the initial depth map to perform an updating operation that propagates (806) a local area in all directions and updates, in parallel, each pixel depth such that boundaries of a refined depth map better align with boundaries of structures in the image.

In embodiments, a refined depth map is output (808) at a final layer of the CSPN, and error is calculated (810) and backpropagated (812). This may be iterated until a stop condition is reached (814).

Figure 9:
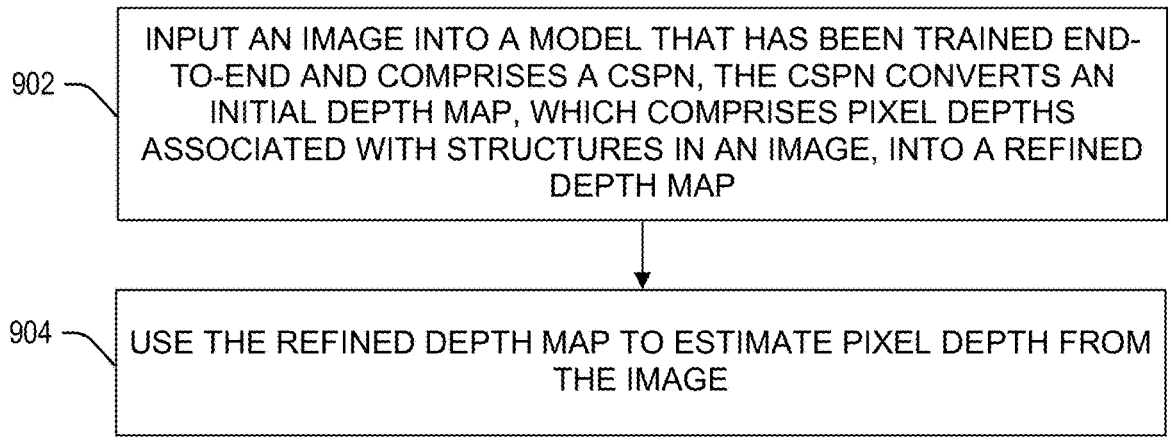
FIG. 9 is a flowchart of an illustrative process for estimating depth from a single image, according to various embodiments of the present disclosure.

FIG. 9 is a flowchart of an illustrative process for estimating depth from a single image, according to various embodiments of the present disclosure. Process 900 for estimating depth from a single image begins at step 910 when an image is input into a model that has been trained end-to-end by using a CSPN, the CSPN converts an initial depth map, which comprises pixel depths associated with structures in an image, into a refined depth map. At step 920, the refined depth map is then used to estimate pixel depth from the image.

Figure 10:
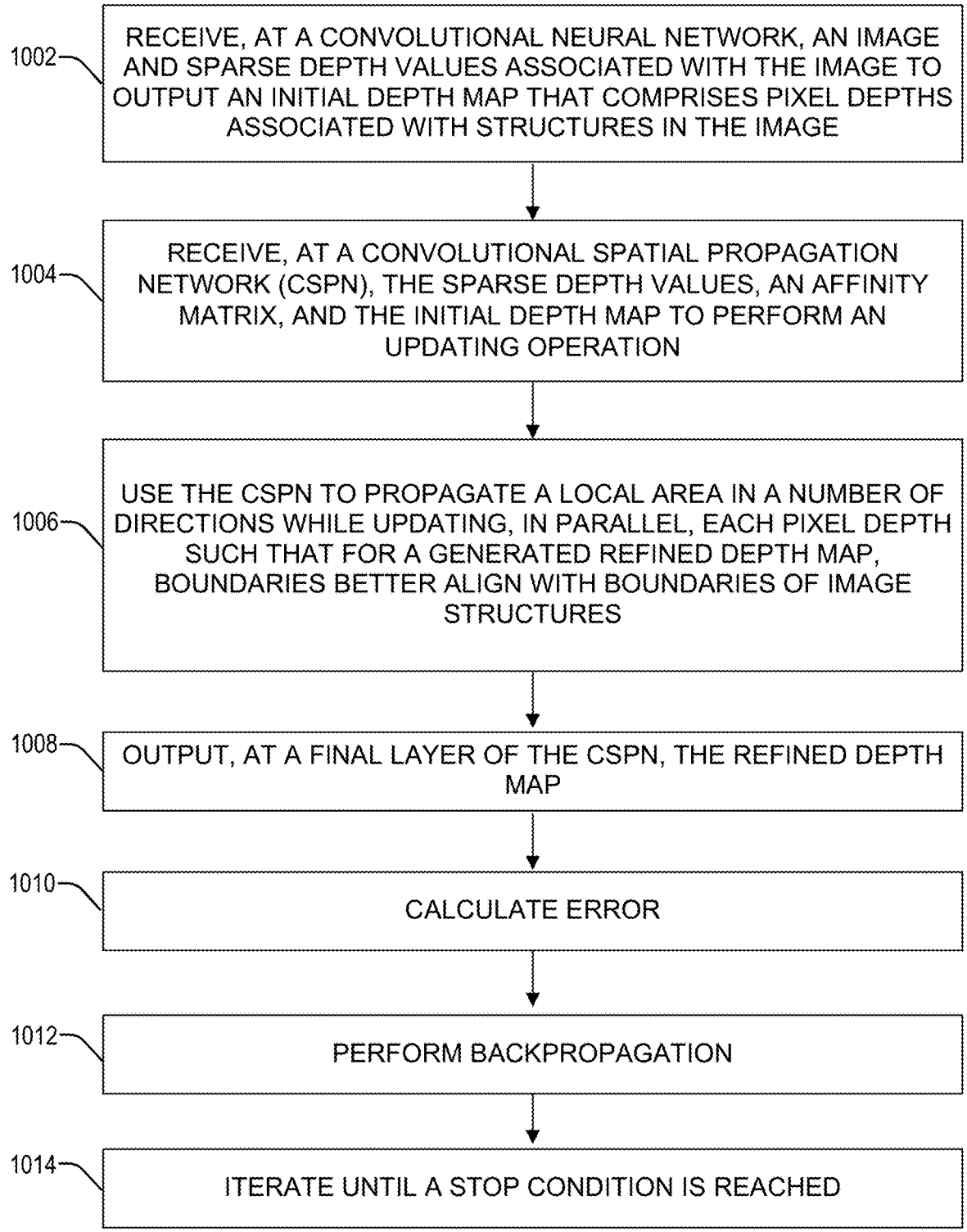
FIG. 10 is a flowchart of an illustrative process for end-to-end training a model for estimating depth from a single image by using a sparse depth matrix, according to various embodiments of the present disclosure.

FIG. 10 is a flowchart of an illustrative process for end-to-end training a model for estimating depth from a single image by using sparse depth values, e.g., from a sparse depth matrix, associated with an input image. Process (1000) for training the model begins when a CNN receives (1002) an image and a sparse depth matrix to outputs an initial depth map that comprises pixel depths associated with structures in the image.

In embodiments, the CSPN receives (1004) an affinity matrix, the sparse depth values, and the initial depth map to perform an updating operation that propagates (806) a local area in all directions and updates, in parallel, each pixel depth such that boundaries of a refined depth map better align with boundaries of structures in the image.

In embodiments, a refined depth map is output (1008) at a final layer of the CSPN, and error is calculated (1010) and backpropagated (1012). This may be iterated until a stop condition is reached (1114).

FIG. 11 is a flowchart of an illustrative process for estimating depth from a single image by using sparse depth values, according to various embodiments of the present disclosure. Process 1100 for estimating depth from a single image begins at step 1110 when an image is input into a model that has been trained end-to-end by using a CSPN, the CSPN converts an initial depth map, which comprises pixel depths associated with structures in an image, into a refined depth map that comprises sparse depth values. At step 1120, the refined depth map is used to estimate pixel depth from the image.

Figure 12:
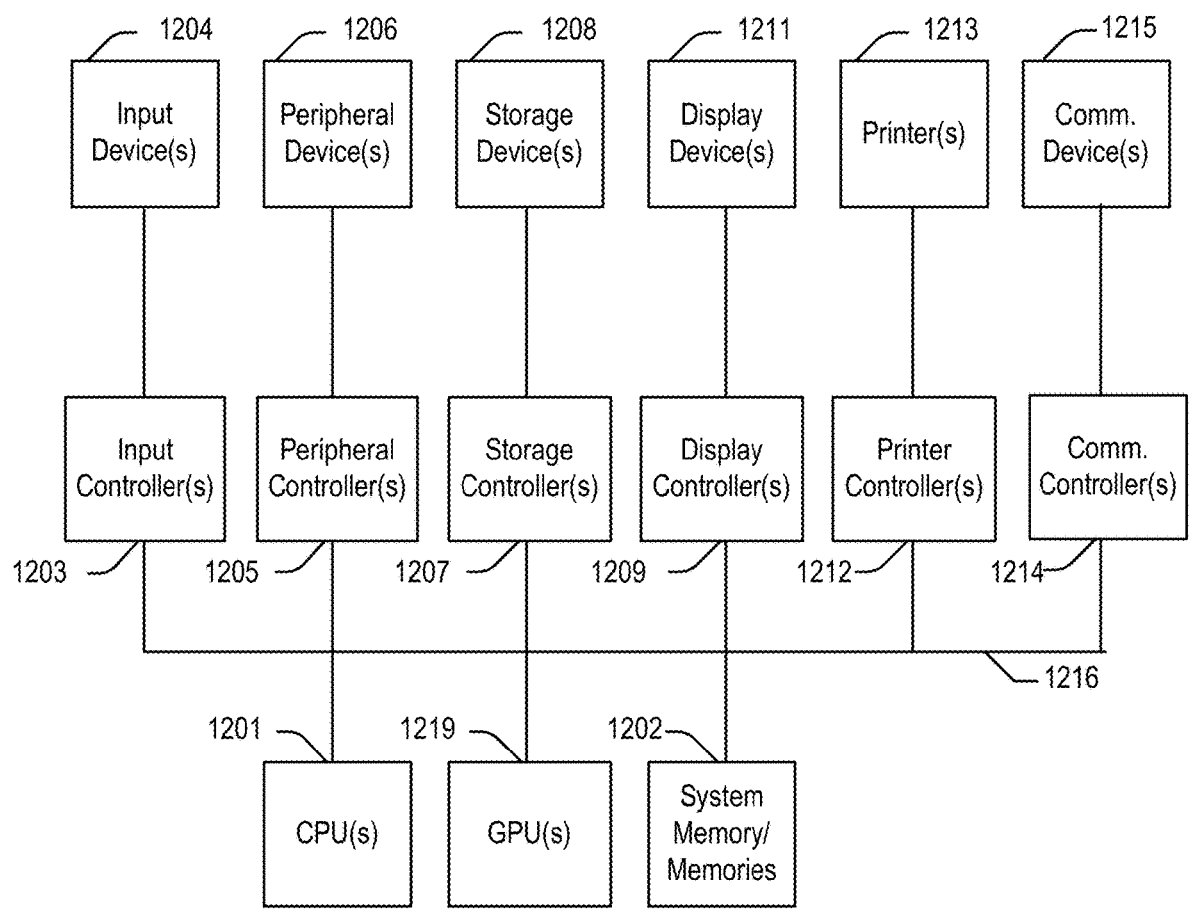
FIG. 12 depicts a simplified block diagram of a computing device/information handling system (or computing system) according to embodiments of the present disclosure.

FIG. 12 depicts a simplified block diagram of a computing device/information handling system (or computing system) according to embodiments of the present disclosure. It will be understood that the functionalities shown for system 1200 may operate to support various embodiments of a computing system—although it shall be understood that a computing system may be differently configured and include different components, including having fewer or more components as depicted in FIG. 12.

As illustrated in FIG. 12, the computing system 1200 includes one or more central processing units (CPU) 1201 that provides computing resources and controls the computer. CPU 1201 may be implemented with a microprocessor or the like, and may also include one or more GPU 1219 and/or a floating-point coprocessor for mathematical computations. System 1200 may also include a system memory 1202, which may be in the form of random-access memory (RAM), read-only memory (ROM), or both.

A number of controllers and peripheral may also be provided, as shown in FIG. 12. An input controller 1203 represents an interface to various input device(s) 1204, such as a keyboard, mouse, touchscreen, and/or stylus. The computing system 1200 may also include a storage controller 1207 for interfacing with one or more storage devices 1208 each of which includes a storage medium such as magnetic tape or disk, or an optical medium that might be used to record programs of instructions for operating systems, utilities, and applications, which may include embodiments of programs that implement various aspects of the present disclosure. Storage device(s) 1208 may also be used to store processed data or data to be processed in accordance with the disclosure. The system 1200 may also include a display controller 1209 for providing an interface to a display device 1211, which may be a cathode ray tube (CRT), a thin film transistor (TFT) display, organic light-emitting diode, electroluminescent panel, plasma panel, or other type of display. The computing system 1200 may also include one or more peripheral controllers or interfaces 1205 for one or more peripheral devices 1206. Examples of peripheral devices may include one or more printers, scanners, input devices, output devices, sensors, and the like. A communications controller 1214 may interface with one or more communication devices 1215, which enables the system 1200 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1216, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for end-to-end training a model for estimating depth from a single image, the method comprising:
    receiving, at a convolutional spatial propagation network (CSPN), an affinity matrix and an initial depth map that comprises pixel depths associated with structures in an image;
    using, by the CSPN, the affinity matrix and the initial depth map to propagate a local area in a plurality of directions while updating, in parallel, each pixel depth recurrently to improve, for a set of boundaries in a refined depth map, an alignment with a set of boundaries of the structures in the image;
    outputting, at a final layer of the CSPN, the refined depth map;
    calculating error;
    performing backpropagation; and
    iterating until a stop condition is reached.

2. The method according to claim 1, further comprising inputting the image into a first convolutional neural network (CNN) to output the initial depth map.

3. The method according to claim 2, wherein the propagation operation learns a diffusion tensor through the CSPN.

4. The method according to claim 3, wherein the CSPN uses a propagation model that is an anisotropic diffusion process and uses a recurrent convolutional operation to obtain a long-range context.

5. The method according to claim 3, further comprising inputting into the first CNN sparse depth values that correspond to ground truth depth values associated with sparse set of pixels and combining the sparse depth values with the image data to output the initial depth map.

6. The method according to claim 5, wherein the CSPN generates the refined depth map in response to receiving the sparse depth values.

7. The method according to claim 5, wherein the convolution by the recurrent network reduces depth gradient errors of surrounding pixels thereby reducing the likelihood of discontinuities when replacing values in the refined depth map with sparse depth values.

8. The method according to claim 5, wherein the ground truth depth values have been obtained through measurements by one of a light detection and ranging system and a line laser senor system.

9. The method according to claim 2, further comprising adding mirror connections to the first CNN by direct concatenating a feature from an encoder to up-projection layers.

10. The method according to claim 1, wherein the affinity matrix is generated by a second CNN that receives the image and that comprises parameters that are learned.

11. The method according to claim 1, wherein the diffusion process comprises learning a diffusion tensor through a deep CNN from the image data.

12. A method for estimating depth from a single image, the method comprising:
    inputting an image into a model that has been trained end-to-end by using a convolutional spatial propagation network (CSPN) that converts an initial depth map that comprises pixel depths associated with structures in an image into a refined depth map by propagating a local area in a plurality of directions while recurrently updating, in parallel, each pixel depth; and
    using the refined depth map to estimate pixel depth from the image.

13. The method according to claim 12, wherein the CSPN receives sparse depth samples and uses the sparse depth samples to generate the refined depth map.

14. The method according to claim 13, wherein values of the sparse depth samples are preserved in the refined depth map.

15. The method according to claim 12, wherein the estimated pixel depth represents a distance between a structure and a camera.

16. A Convolutional Spatial Propagation Network (CSPN) system comprising:
    a processor; and
    a non-transitory computer-readable medium comprising instructions that, when executed by the processor, cause steps to be performed, the steps comprising:
        receiving, by a convolutional neural network (CNN), an image to generate an initial depth map;
        receiving, by an input layer, at least an affinity matrix and the initial depth map, the initial depth map comprising pixel depths associated with structures in the image;
        using a recurrent neural network (RNN) to propagate a local area in a plurality of directions while updating, in parallel, each pixel depth to improve, for a set of boundaries in a refined depth map, an alignment with a set of boundaries of the structures in the image; and
        outputting, at a final layer, refined depth map.

17. The system according to claim 16, further comprising one or more depth sensors that measure depth samples, the CSPN uses the sparse depth samples to generate the refined depth map.

18. The system according to claim 17, wherein values of the sparse depth samples are preserved in the refined depth map.

19. The system according to claim 16, wherein the two or more of the pixel depths are updated using the propagation operation.

20. The system according to claim 19, wherein the propagation process is an anisotropic diffusion process that propagates a local area in a plurality of directions.

\* \* \* \* \*